US011964505B2

(12) United States Patent
Sugimoto

(10) Patent No.: US 11,964,505 B2
(45) Date of Patent: Apr. 23, 2024

(54) PRINTER

(71) Applicant: TOSHIBA TEC KABUSHIKI KAISHA, Tokyo (JP)

(72) Inventor: Kazuaki Sugimoto, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 449 days.

(21) Appl. No.: 17/223,037

(22) Filed: Apr. 6, 2021

(65) Prior Publication Data

US 2022/0048301 A1 Feb. 17, 2022

(30) Foreign Application Priority Data

Aug. 12, 2020 (JP) ................................. 2020-136393

(51) Int. Cl.
*B41J 35/08* (2006.01)
*B41J 31/00* (2006.01)
*B41J 33/54* (2006.01)

(52) U.S. Cl.
CPC ............... *B41J 35/08* (2013.01); *B41J 31/00* (2013.01); *B41J 33/54* (2013.01)

(58) Field of Classification Search
CPC ... B41J 2/325; B41J 31/00; B41J 35/08; B41J 33/54
See application file for complete search history.

(56) References Cited

U.S. PATENT DOCUMENTS

2011/0229239 A1* 9/2011 Lakin ...................... B41J 35/08 400/234

FOREIGN PATENT DOCUMENTS

| | | | |
|---|---|---|---|
| GB | 2586834 | * | 9/2021 |
| JP | 51-014406 A | | 2/1976 |
| JP | 2008-137318 | | 6/2008 |

OTHER PUBLICATIONS

Japanese Office Action for Japanese Patent Application No. 2020-136393 dated Jan. 16, 2024.

* cited by examiner

*Primary Examiner* — Christopher E Mahoney
*Assistant Examiner* — Marissa Ferguson-Samreth
(74) *Attorney, Agent, or Firm* — Amin, Turocy & Watson, LLP

(57) ABSTRACT

A printer includes a shaft-shaped member, a movable support portion, paired strain detection units, and a control unit. The shaft-shaped member that sets a path of an ink ribbon from a supplying shaft to a winding shaft is provided at least on a downstream side between an upstream side and the downstream side in a conveying direction at a position where a thermal head and a platen face each other with a recording medium interposed therebetween, and the ink ribbon is hung around the shaft-shaped member. The movable support portion movably supports at least one end portion of the shaft-shaped member in a direction in which a tension of the ink ribbon varies. The paired strain detection units are provided at both end portions of the shaft-shaped member, and an output thereof is varied according to a strain of the shaft-shaped member. The control unit controls movement of the shaft-shaped member in a direction in which a difference in output between the paired strain detection units becomes small.

20 Claims, 8 Drawing Sheets

PRINTER

CROSS-REFERENCE TO RELATED APPLICATION

This application is based upon and claims the benefit of priority from Japanese Patent Application No. 2020-136393, filed on Aug. 12, 2020, the entire contents of which are incorporated herein by reference.

FIELD

Embodiments described herein relate generally to printers.

BACKGROUND

In the related art, there is a printer using an ink ribbon (for example, JP-A-2008-137318). In such a printer, an ink ribbon and a sheet-shaped recording medium are interposed between a thermal head and a platen roller, and the ink ribbon and the sheet-shaped recording medium are heated by the thermal head while being conveyed by rotation of the platen roller. Therefore, by allowing the ink on the surface of the ink ribbon to move to the surface of the recording medium, printing is performed.

Since the ink ribbon is very thin, when the tension varies in the width direction of the ribbon, winkle of the ribbon occurs, and thus, the winkle causes printing defects. Therefore, it is preferable that the tension applied to the ink ribbon is as uniform as possible.

In order to allow the tension of the ink ribbon to be uniform, it is effective to secure a predetermined degree of parallelization in each of components, for example, a supplying shaft and a winding shaft of the ink ribbon, a thermal head, a platen roller, and the like of a conveyance path of the ink ribbon. However, due to the dimensional tolerances and assembly errors of each component, it is difficult to obtain the predetermined degree of parallelization just by assembling. Therefore, after the assembly, final adjustments are individually performed. At present, the final adjustments are performed by a sensory method of observing the surface condition of the ink ribbon, so that it is difficult for anyone other than a skilled worker to perform the adjustment with high accuracy.

DETAILED DESCRIPTION

The disclosure herein provides a printer that can be easily adjusted to allow a tension of an ink ribbon to be uniform.

According to one embodiment, a printer includes a shaft-shaped member, a movable support portion, paired strain detection units, and a control unit. The shaft-shaped member that sets a path of an ink ribbon from a supplying shaft to a winding shaft is provided at least on a downstream side between an upstream side and the downstream side in a conveying direction at a position where a thermal head and a platen face each other with a recording medium interposed therebetween, and the ink ribbon is hung around the shaft-shaped member. The movable support portion movably supports at least one end portion of the shaft-shaped member in a direction in which a tension of the ink ribbon varies. The paired strain detection units are provided at both end portions of the shaft-shaped member, and an output thereof is varied according to a strain of the shaft-shaped member. The control unit controls movement of the shaft-shaped member in a direction in which a difference in output between the paired strain detection units becomes small.

First Embodiment

Figure 1:
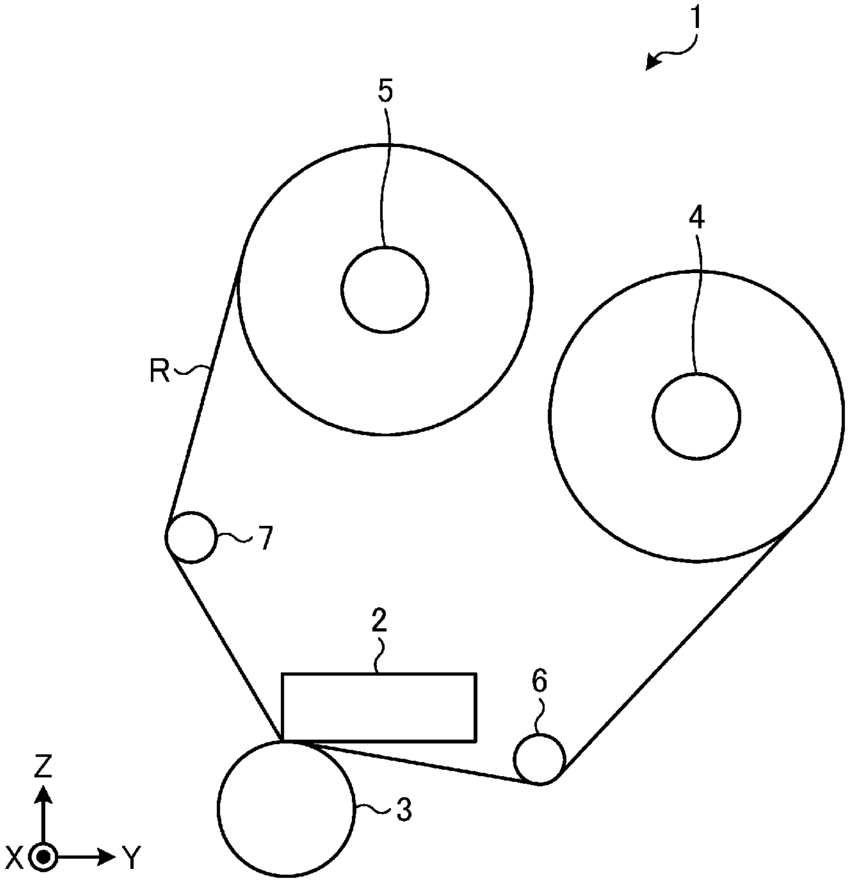
FIG. 1 is a diagram schematically illustrating a structure of main components of a printer according to a first embodiment.

The embodiment will be described with reference to the drawings. FIG. 1 is a diagram schematically illustrating a structure of main components of a printer 1 according to the present embodiment. For the convenience of the following description, an orthogonal coordinate system configured with the X axis, the Y axis, and the Z axis is attached to the figure. In the figure, the direction indicated by the arrow is the positive direction, and the opposite is the negative direction.

The printer 1 performs printing by thermally transferring the ink on the surface of an ink ribbon R to a sheet-shaped recording medium (hereinafter, simply referred to as paper). Such a printer 1 includes a thermal head 2, a platen 3, a ribbon supplying shaft 4, a ribbon winding shaft 5, guide shafts (an example of a shaft-shaped member) 6 and 7, and the like.

The thermal head 2 includes a large number of heat generating elements and selectively drives the heat generating elements in response to printing data to melt the ink on the surface of the ink ribbon R. In the present embodiment, the heat generating elements are arranged in the substantially X axis direction. The platen 3 is a roller of which surface is made of an elastic material, interposes the paper and the ink ribbon R between the platen 3 and the thermal head 2 and rotates to convey (or to reversely convey) the paper and the ink ribbon R. The axial direction of the roller constituting the platen 3 is substantially the X axis direction. The direction in which the platen 3 conveys (or reversely conveys) the paper and the ink ribbon R is the Y axis direction in the present embodiment.

The ribbon supplying shaft 4 supports the wound ink ribbon R that has not been used, and thus, the ink ribbon R is supplied or rewound by rotating the ribbon supplying shaft 4. The ribbon winding shaft 5 winds up the ink ribbon R that has been used, and thus, the ink ribbon R is wound or rewound by rotating the ribbon winding shaft 5. The axial direction of the ribbon supplying shaft 4 is substantially parallel to the X axis direction in the present embodiment.

The guide shafts 6 and 7 constitute a shaft-shaped member around which the ink ribbon R is hung and are used for setting a conveyance path of the ink ribbon R from the ribbon supplying shaft 4 to the ribbon winding shaft 5. The guide shaft 6 is provided on an upstream side in a conveying direction at a position where the thermal head 2 and the platen 3 face each other with the paper interposed therebetween. The guide shaft 7 is provided on a downstream side in the conveying direction at the position where the thermal head 2 and the platen 3 face each other with the paper interposed therebetween. The axial directions of the guide shafts 6 and 7 are substantially parallel to the X axis direction in the present embodiment.

Figure 2:
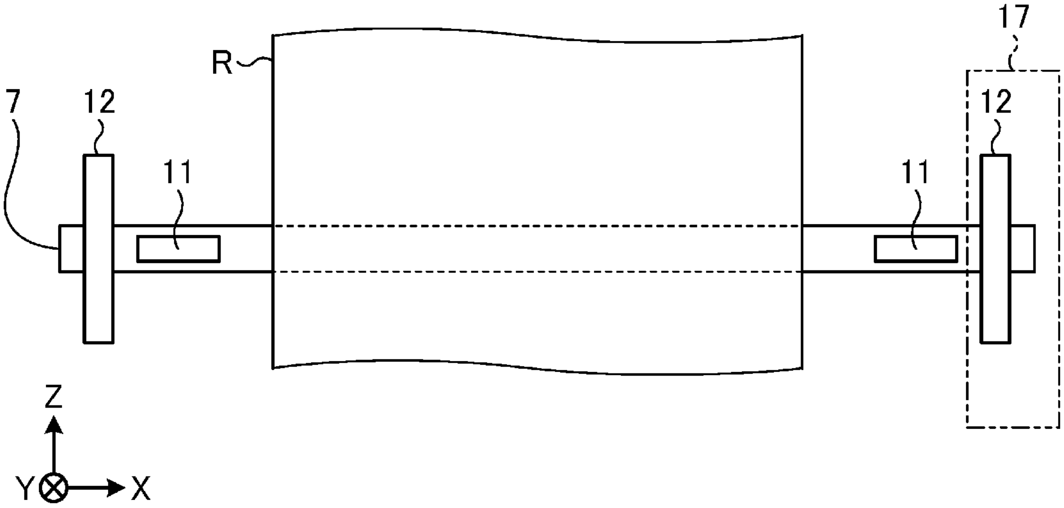
FIG. 2 is a view of a guide shaft and a peripheral portion thereof.

Hereinafter, the guide shaft 7 and the peripheral portion thereof are described as an example, but the structure of the guide shaft 6 and the peripheral portion thereof is also the same. FIG. 2 is a view of the guide shaft 7 and the peripheral portion thereof. The printer 1 further includes a strain gauge 11, a support portion 12, and a movable support portion 17. Both end portions of the guide shaft 7 are supported by the support portion 12 and the other support portion 12 (refer to FIG. 3, described later) that is paired with the support portion 12 and included in the movable support portion 17, respectively.

The strain gauge 11 is a well-known one and is attached by laying the longitudinal direction along the axial direction of the guide shaft 7, is extended or compressed (deformed) following a minute curvature (distortion, strain) of the guide shaft 7, and allows the output (resistance value) to vary in response to the deformation.

More specifically, a plurality (for example, two) of the strain gauges 11 are used as one set, and the set (strain gauge set) is provided at both end portions of the guide shaft 7. The end portion is a portion outside the width direction of the ink ribbon R hung on the guide shaft 7, that is, a portion between the edge of the ink ribbon R and the end of the guide shaft 7 closer to the edge.

When the strain gauge set includes the two strain gauges 11, the guide shaft 7 has two planes facing each other in the radial direction on the surface, and the strain gauges 11 are attached to the respective two planes. The two planes are provided in order to prevent the curvature of the attaching surface from influencing on the outputs of the strain gauges 11. A plane direction of the strain gauge 11 is adjusted to a vector direction of a load. By providing the guide shaft 7 with two planes, a distortion amount can be adjusted by adjusting a distance (that is, a plate thickness) between the two planes, so that the output can be adjusted.

In a case where one of the two planes is set as the front surface and the other is set as the back surface, when the load is applied to the guide shaft 7 from the front surface direction, the front surface is distorted in the compression direction and the back surface is distorted in the extension direction, so that in the strain gauge 11 of each plane, a reverse change in resistance value occurs. The change is detected by an output of a bridge circuit assembled including a set of two strain gauges 11. The bridge circuit outputs a voltage value that changes in response to difference between the resistance values of the two strain gauges 11 included in one set. The bridge circuit is assembled at each end portion of the guide shaft 7.

Herein, the strain gauge set and the bridge circuit constitute an example of the "strain detection unit". The strain detection units provided at both end portions of the guide shaft 7 are an example of "paired strain detection units". The "output of the strain detection unit" in the present embodiment is the output of the bridge circuit.

As illustrated in FIG. 1, the guide shafts 6 and 7 are located inside the range surrounded by the ink ribbon R from being pulled out from the ribbon supplying shaft 4 to being wound by the ribbon winding shaft, and are in contact with the ink ribbon R. The guide shafts 6 and 7 are slightly distorted toward the inside of the range surrounded by the ink ribbon R by receiving pressure from the ink ribbon R. The outputs of the strain gauges 11 vary in response to the degree of distortion generated in the guide shafts 6 and 7. When the tension of the ink ribbon R is substantially uniform in the width direction of the ink ribbon R, the corresponding strain gauges 11 at both end portions of the guide shafts 6 and 7 output substantially the same value. Here, the outputs of the paired strain detection units (that is, the outputs of the bridge circuit) have substantially the same value. On the contrary, when the tension of the ink ribbon R is non-uniform in the width direction of the ink ribbon R, there is a difference in output between the paired strain detection units.

Figure 3:
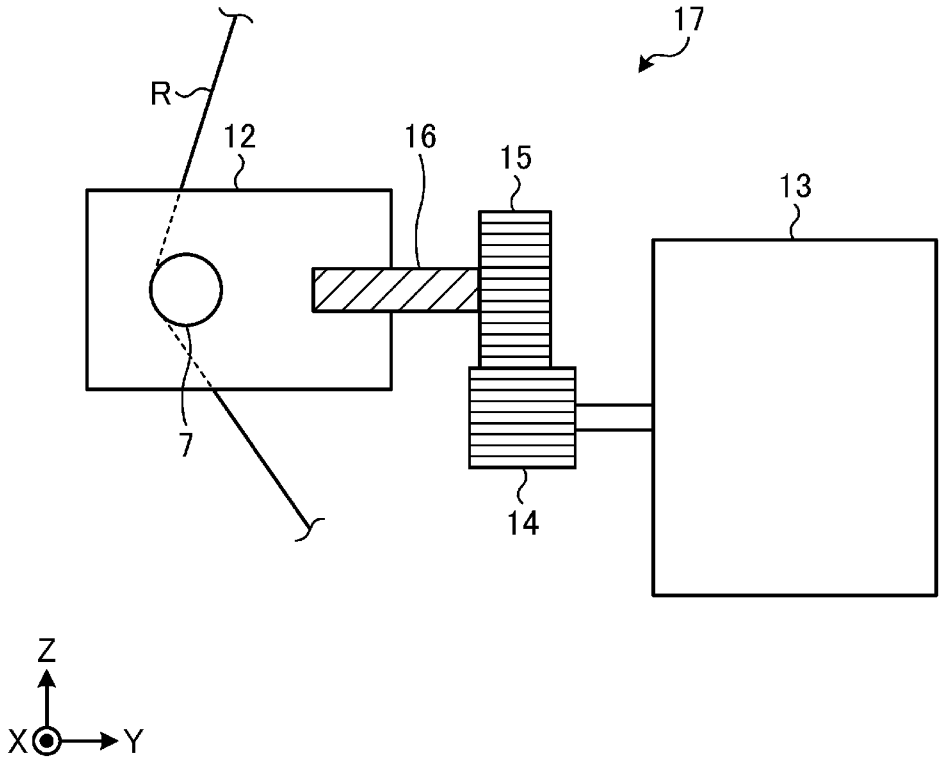
FIG. 3 is a diagram illustrating a structure of a movable support portion.

FIG. 3 is a diagram illustrating a structure of the movable support portion 17. The movable support portion 17 is configured to include one of the paired support portions 12, and one end portion of the guide shaft 7 is movably supported in a direction (in the present embodiment, substantially the Y axis direction) in which the tension of the ink ribbon R varies.

In addition to one of the support portions 12, the movable support portion 17 further includes a tension adjusting motor (an example of a drive unit) 13, gears 14 and 15, a screw 16, and the like. The tension adjusting motor 13 moves the guide shaft 7, and more specifically, generates a driving force for automating the movement of the guide shaft 7.

The gear 14 is attached to the rotation shaft of the tension adjusting motor 13 and is coaxial with the rotation shaft. When the tension adjusting motor 13 is driven, the gear 14 rotates. The gear 15 engages with the gear 14 and rotates by transmission of the rotation of the gear 14. The screw 16 is coaxial with the gear 15 and rotates by the rotation of the gear 15. The screw 16 is engaged to the support portion 12, and by rotation of the screw, the screw is displaced with respect to the support portion 12 in the own axial direction thereof.

The tension adjusting motor 13, the gears 14 and 15, and the screw 16 rotate, respectively, but the rotation shaft does not move. When the screw 16 rotates, the support portion 12 moves in a rotation axis direction of the screw 16. Therefore, the guide shaft 7 moves in a direction perpendicular to the own axis (Y axis direction and left-right direction in FIG. 3) thereof.

Herein, in the present embodiment, one end portion of the guide shaft 7 is supported by the movable support portion 17 and the other end portion thereof is supported by the support portion 12, but in the implementation, the other end portion of the guide shaft 7 may also be supported by the movable support portion 17.

In the present embodiment, at least one end portion of the guide shafts 6 and 7 is movably supported by using the movable support portion 17, but in the implementation, at least one end portion of any one of the guide shafts 6 and 7 may be movably supported by the movable support portion 17. Here, it is considered that it is preferable to use the guide shaft 7 of which at least one end portion is movably supported from the viewpoint of maintaining appropriate printing performance.

Figure 4:
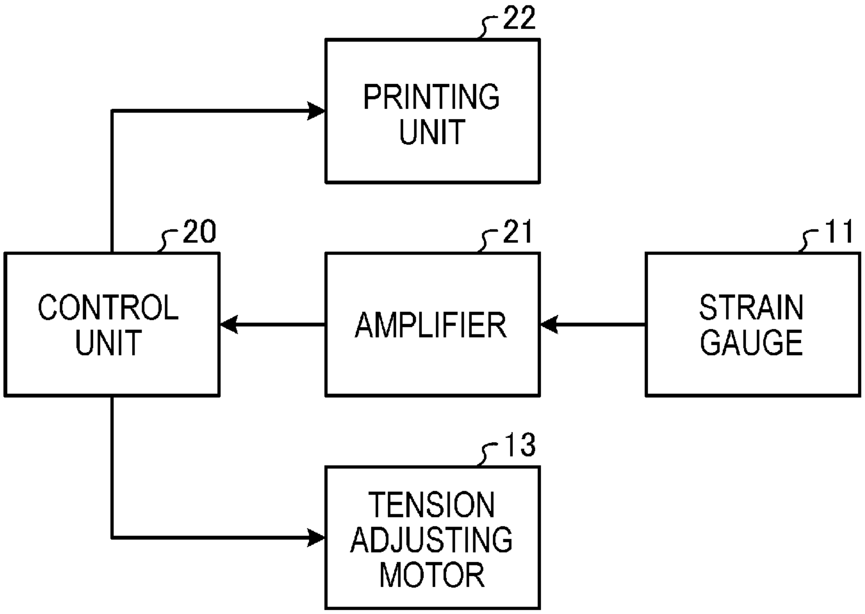
FIG. 4 is a block diagram illustrating a relationship between electronic components and functional units configured with the electronic components.

FIG. 4 is a block diagram illustrating a relationship between electronic components and functional units configured with the electronic components. The printer 1 further includes a control unit 20, an amplifier 21, and the like. A printing unit 22 includes the thermal head 2 and the platen 3. The amplifier 21 amplifies the output of the strain gauge 11 and transmits the output to the control unit 20.

The control unit 20 is microcomputer or the like including a central processing unit (CPU), a read only memory (ROM), a random access memory (RAM), and the like. The ROM stores various programs executed by the CPU and various data. The RAM temporarily stores data and programs when the CPU executes various programs. The control unit 20 realizes various functions by the CPU executing various programs stored in the ROM or the like.

Such a control unit 20 controls the printing unit 22 based on the printing data received from an external device to perform printing. The control unit 20 promotes the movement of the guide shaft 6 (7) in the direction in which the difference in output between the paired strain detection units becomes small. As a specific example of the present embodiment, the control unit 20 drives the tension adjusting motor 13 based on the input from the amplifier 21.

Figure 5:
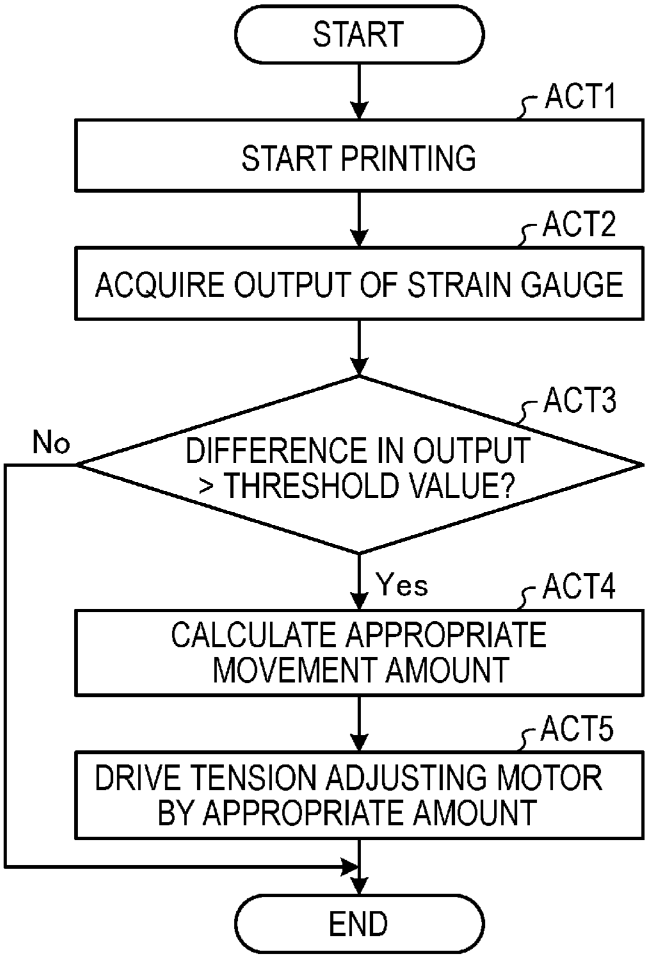
FIG. 5 is a flowchart illustrating an example of a flow of processes executed by a control unit.

FIG. 5 is a flowchart illustrating an example of a processing flow executed by the control unit 20. When the control unit 20 instructs the printing unit 22 to start printing (step S1), the control unit 20 acquires the output of the strain gauge 11 amplified by the amplifier 21 (step S2).

Steps S3 to S5 are processes performed for each of the guide shaft 6 and the guide shaft 7. Hereinafter, the guide shaft 7 is described as an example, but the same applies to the guide shaft 6.

The control unit 20 compares the outputs of the paired strain detection units to obtain the difference in output, and when the difference in output exceeds a predetermined threshold value (Yes in step S3), the control unit calculates an appropriate movement amount of the support portion 12 (step S4). Then, the control unit 20 drives the tension adjusting motor 13 by an amount (appropriate amount) in response to the appropriate movement amount (step S5).

It is noted that the "appropriate amount" is predetermined according to the difference in output and is stored in a predetermined storage unit that can be accessed by the control unit 20. Therefore, the control unit 20 can control the tension adjusting motor 13 so that the guide shaft 6 or 7 moves by a predetermined amount according to the difference in output between the paired strain detection units.

As described above, the support portion 12 of which driving power is transmitted through the gears 14 and 15 and the screw 16 moves in the rotation axis direction of the screw 16 by an appropriate movement amount. Therefore, the guide shaft 7 moves in a direction perpendicular to the own axis (Y axis direction, left-right direction in FIG. 3) thereof.

In step S3, in the control unit 20, when the difference in output between the paired strain detection units does not exceed a predetermined threshold value (No in step S3), it is considered that the tension of the ink ribbon R is substantially uniform in the width direction, and thus, the process is ended.

As described above, according to the printer 1 of the embodiment, the degree of non-uniformity of the tension of the ink ribbon R in the width direction is detected through the output of the strain gauges 11 attached to the guide shafts 6 and 7 that receive the tension of the ink ribbon R, and the positions of the guide shafts 6 and 7 are adjusted in response to the degree, so that the tension of the ink ribbon R can be allowed to be uniform. Therefore, according to the present embodiment, it is possible to easily perform adjustments for allowing the tension of the ink ribbon R to be uniform.

Hereinafter, some other embodiments are described. Each embodiment is a modified example of the above-described embodiment. In the description of each embodiment, the components different from those of the above-described embodiment will be mainly described, the components common to the above-described embodiment will be denoted by same reference numerals as those of the above-described embodiment, and detailed description thereof will be omitted.

Second Embodiment: Modified Example of Structure

In the above-described embodiment described with reference to FIGS. 1 to 5, the adjustment of the tension of the ink ribbon R is automatically performed by the driving force of the tension adjusting motor 13, but in the implementation, the adjustment of the tension of the ink ribbon R is configured in structure to be manually performed, and the control unit 20 may guide the adjustment amount by controlling a display device, a speaker, or the like.

Third Embodiment: Modified Example of Processes

Figure 6:
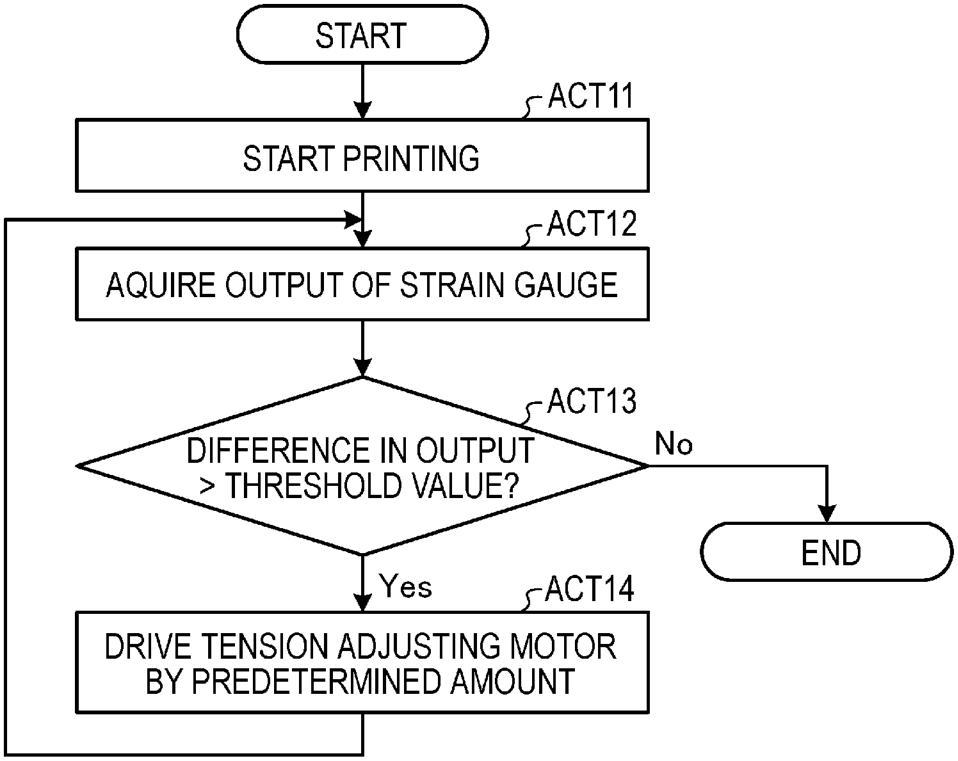
FIG. 6 is a flowchart illustrating another example of the flow of processes executed by the control unit.

FIG. 6 is a flowchart illustrating another example of the flow of processes executed by the control unit 20. In the process, when the control unit 20 instructs the printing unit 22 to start printing (step S11), the control unit 20 acquires the output of the strain gauge 11 amplified via the amplifier 21 (step S12).

Steps S13 to S15 are processes performed for each of the guide shaft 6 and the guide shaft 7. Hereinafter, the guide shaft 7 is described as an example, but the same applies to the guide shaft 6.

The control unit 20 compares the outputs of the paired strain detection units to obtain the difference in output, when the difference in output exceeds a predetermined threshold value (Yes in step S13), the control unit drives the tension adjusting motor 13 by a predetermined amount (Step S14), and the process returns to step S12.

In step S13, when the difference in output between the paired strain detection units does not exceed a predetermined threshold value (No in step S13), the control unit 20 determines that the tension of the ink ribbon R is substantially uniform in the width direction, and the process is ended.

It is noted that the "predetermined amount" is a predetermined value appropriate for obtaining a minute movement amount and is stored in a predetermined storage unit that can be accessed by the control unit 20. Therefore, the control unit 20 can control the tension adjusting motor 13 so that the guide shaft 6 or 7 moves by a predetermined amount.

As such, the control unit 20 may control the tension adjusting motor 13 while monitoring the difference in output between the paired strain detection units and may continue to control the tension adjusting motor 13 until the difference in output falls below a predetermined threshold value. According to the above-described processing, it is possible to obtain the same effect as that of the above-described embodiments.

Fourth Embodiment: Modified Example of Processes

In the processes illustrated in FIGS. 5 and 6, the control unit 20 performs the process step S2 and the subsequent processes with the start of printing (step S1), but the process step S2 and the subsequent processes may be performed each time the accumulated print amount exceeds a predetermined threshold value. Here, the storage of the accumulated printing amount is reset each time the process is executed.

For example, in the case of continuous issuing, when the printing density is non-uniform in the axial direction, in some cases, the diameter of the ink ribbon R wound around the ribbon winding shaft 5 may be non-uniform in the axial direction, but by performing the process as such, it is possible to restore the uniformity of the tension even in a case where the uniformity of the tension of the ink ribbon R is disturbed due to the continuation of continuous issuing.

Fifth Embodiment: Modified Example of Processes

In the implementation, the control unit 20 may perform the process described in step S2 and subsequent steps at the timing of replacing the ink ribbon R.

Sixth Embodiment: Modified Example of Structure

Figure 7:
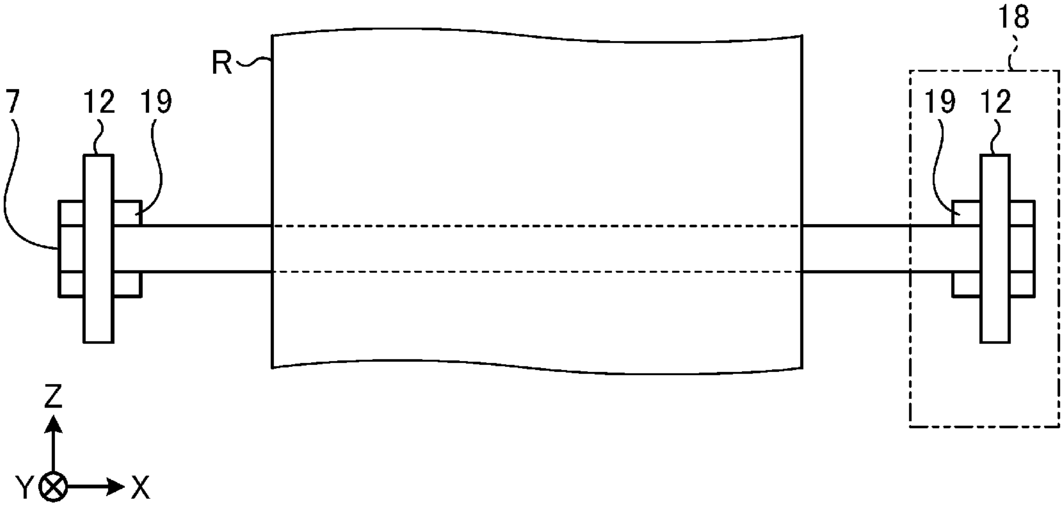
FIG. 7 is a view of a guide shaft and a peripheral portion thereof in a sixth embodiment.
Figure 8:
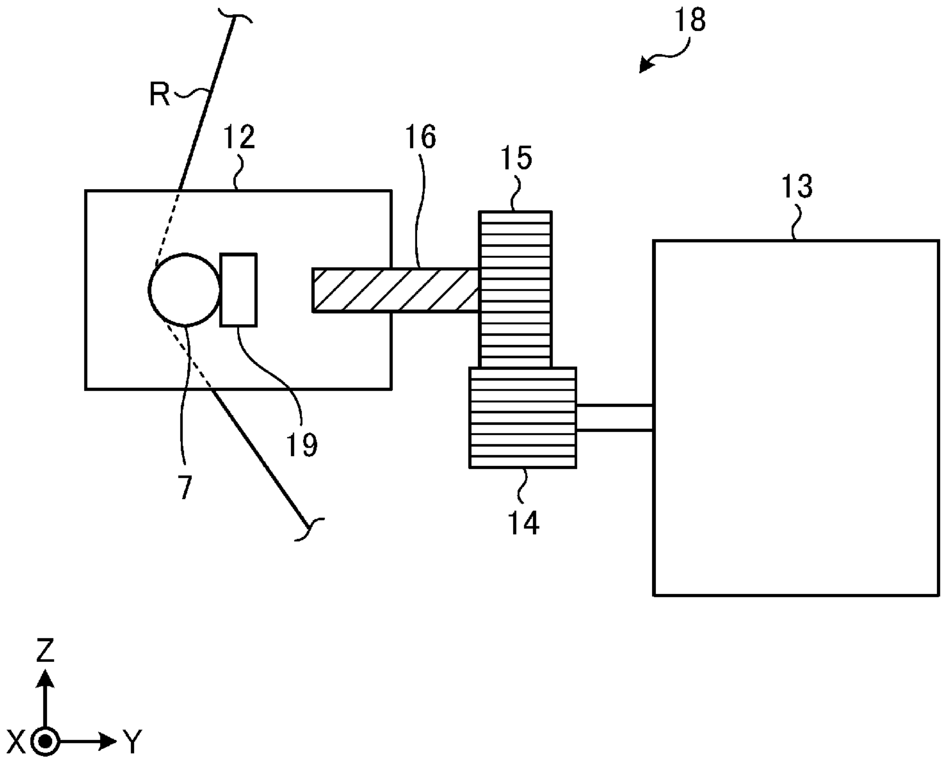
FIG. 8 is a diagram illustrating a structure of a movable support portion.

FIG. 7 is a view of the guide shaft 7 and the peripheral portion thereof in the present embodiment. FIG. 8 is a diagram illustrating the structure of a movable support portion 18. In the present example, the support portion 12 movably supports both end portions of the guide shaft 7 within a predetermined range in a substantially Y axis direction, and a load cell 19 is provided at an end of the movable range on the downstream side in the Y axis direction.

The load cell 19 is deformed in response to the load received from the ink ribbon R on the guide shaft 7, and the output is changed in response to an amount of the deformation. By using such a load cell 19 instead of the strain detection unit of the above-described embodiment, the same processing as that of the above-described embodiment can be performed, and the same effect can be obtained.

The program executed by the control unit 20 of the printer 1 in the above-described embodiment is provided by being incorporated into the ROM or the like in advance.

The program executed by the printer 1 according to each of the above-described embodiments may be configured so as to be provided as a file in an installable format or in an executable format recorded on a computer-readable recording medium such as a CD-ROM, a flexible disk (FD), a CD-R, or a digital versatile disk (DVD).

The program executed by the control unit 20 of the printer 1 according to each of the above-described embodiments may be stored on a computer connected to a network such as the Internet or may be provided by downloading via a network. The program executed by the control unit 20 of the printer 1 according to each of the above-described embodiments may be provided or distributed via a network such as the Internet.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A printer, comprising:

a shaft-shaped member that sets a path of an ink ribbon from a supplying shaft to a winding shaft and is provided at least on a downstream side between an upstream side and the downstream side in a conveying direction at a position where a thermal head and a platen face each other with a recording medium interposed therebetween, the ink ribbon being hung around the shaft-shaped member;

a movable support portion that movably supports at least one end portion of the shaft-shaped member in a direction in which a tension of the ink ribbon varies;

paired strain detection components that are provided at both end portions of the shaft-shaped member, and an output thereof is varied according to a strain of the shaft-shaped member; and a controller that controls movement of the shaft-shaped member in a direction in which a difference in output between the paired strain detection components decreases.

2. The printer according to claim 1, further comprising:

a drive component that moves the shaft-shaped member, wherein the controller controls the drive component so that the difference in output between the strain detection components decreases.

3. The printer according to claim 2, wherein the controller controls the drive component so that the shaft-shaped member moves by a predetermined amount according to the difference in output.

4. The printer according to claim 2, wherein the controller controls the drive component while monitoring the difference in output and continues to control the drive component until the difference in output decreases below a predetermined threshold value.

5. The printer according to claim 1, wherein the control of the controller is performed for each predetermined printing amount.

6. The printer according to claim 1, further comprising a plurality of heat generating elements arranged in a substantially axis direction.

7. The printer according to claim 1, wherein the supplying shaft and the winding shaft have axial directions that are substantially parallel to each other.

8. The printer according to claim 1, wherein the supplying shaft and the winding shaft have axial directions substantially parallel to the substantially axis direction.

9. A method of applying uniform tension to an ink ribbon in a printer, comprising:

setting by a shaft-shaped member a path of an ink ribbon from a supplying shaft to a winding shaft at least on a downstream side between an upstream side and the downstream side in a conveying direction at a position where a thermal head and a platen face each other with a recording medium interposed therebetween, the ink ribbon being hung around the shaft-shaped member;

movably supporting at least one end portion of the shaft-shaped member in a direction in which a tension of the ink ribbon varies;

varying an output of paired strain detection components provided at both end portions of the shaft-shaped member according to a strain of the shaft-shaped member; and controlling movement of the shaft-shaped member in a direction in which a difference in output between the paired strain detection components decreases.

10. The method according to claim 9, further comprising: moving the shaft-shaped member and controlling the moving so that the difference in output between the strain detection components decreases.

11. The method according to claim 10, further comprising:

controlling the moving so that the shaft-shaped member moves by a predetermined amount according to the difference in output.

12. The method according to claim 10, further comprising:

controlling the moving while monitoring the difference in output and continuing to control the drive component until the difference in output decreases below a predetermined threshold value.

13. A thermal printer, comprising:

a shaft-shaped member that sets a path of an ink ribbon from a supplying shaft to a winding shaft and is provided at least on a downstream side between an upstream side and the downstream side in a conveying direction at a position where a thermal head and a platen face each other with a recording medium interposed therebetween, the ink ribbon being hung around the shaft-shaped member;

a movable support portion that movably supports at least one end portion of the shaft-shaped member in a direction in which a tension of the ink ribbon varies;

paired strain detection components that are provided at both end portions of the shaft-shaped member, and an output thereof is varied according to a strain of the shaft-shaped member; and a controller that controls movement of the shaft-shaped member in a direction in which a difference in output between the paired strain detection components decreases.

14. The thermal printer according to claim 13, further comprising:

a drive component that moves the shaft-shaped member, wherein the controller controls the drive component so that the difference in output between the strain detection components decreases.

15. The thermal printer according to claim 14, wherein the controller controls the drive component so that the shaft-shaped member moves by a predetermined amount according to the difference in output.

16. The thermal printer according to claim 14, wherein the controller controls the drive component while monitoring the difference in output and continues to control the drive component until the difference in output decreases below a predetermined threshold value.

17. The thermal printer according to claim 13, wherein the control of the controller is performed for each predetermined printing amount.

18. The thermal printer according to claim 13, further comprising a plurality of heat generating elements arranged in a substantially axis direction.

19. The thermal printer according to claim 13, wherein the supplying shaft and the winding shaft have axial directions that are substantially parallel to each other.

20. The thermal printer according to claim 13, wherein the supplying shaft and the winding shaft have axial directions substantially parallel to the substantially axis direction.

* * * * *